2,882,447
ANODE PULSER

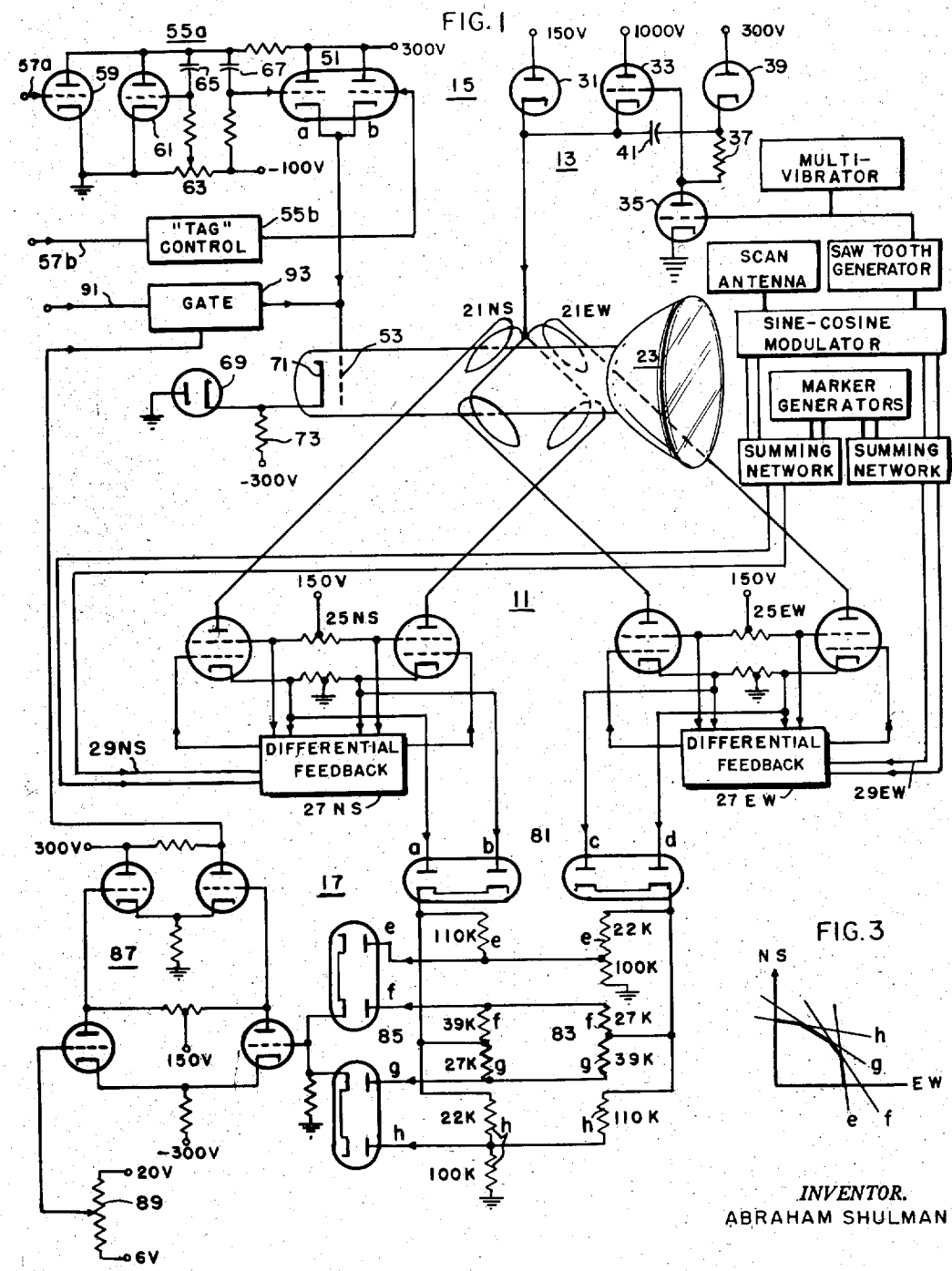

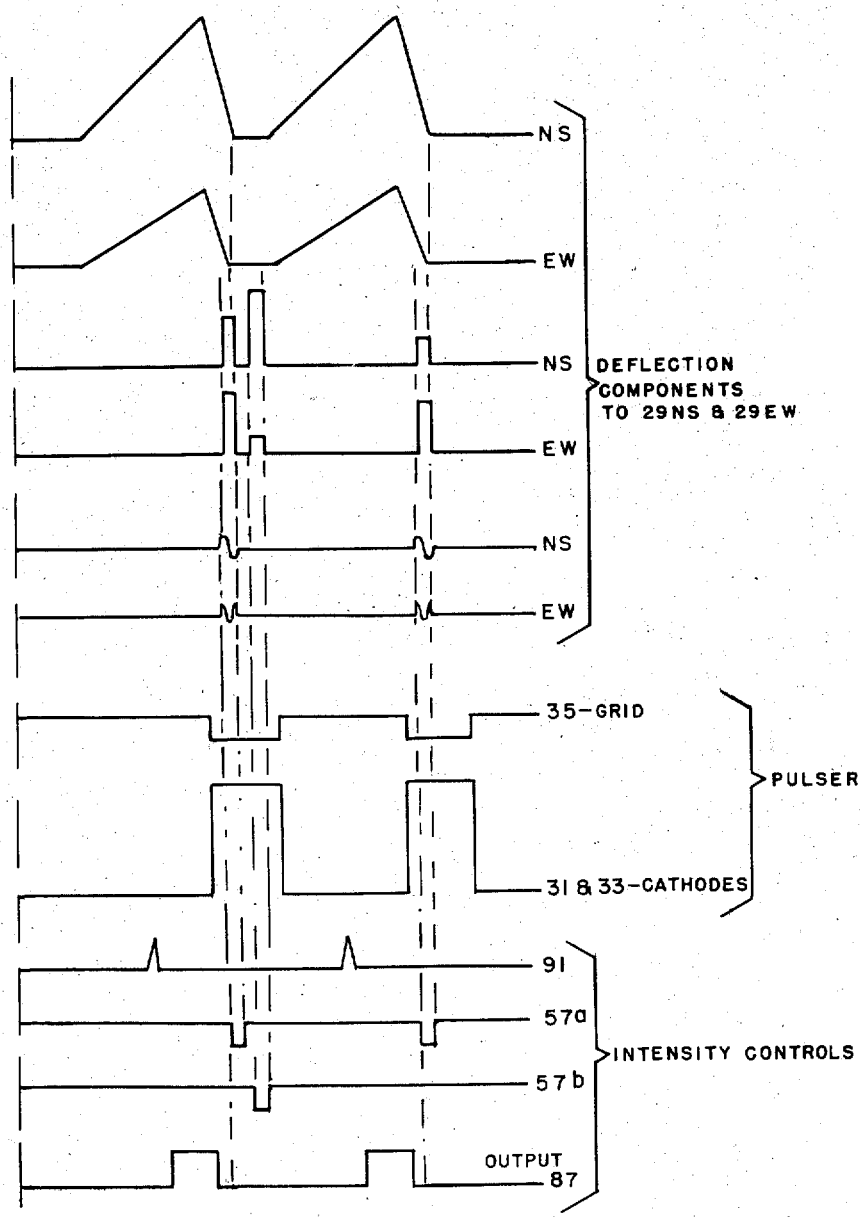

Abraham Shulman, Jamaica, N.Y., assignor to the United States of America as represented by the Secretary of the Army Application February 26, 1957, Serial No. 642,631

6 Claims. (Cl. 315—27)

This invention relates to an anode pulsing circuit suitable for the final driver amplifier in the magnetic deflection system of certain types of cathode ray tube displays.

In ordinary television deflection circuits or radar P.P.I. systems using a rotating deflecting coil directly on the cathode ray tube neck, or inductively coupled to a yoke on the cathode ray tube neck, a regularly recurrent sweep waveform is used. This regularity permits the deflection driver amplifier anode voltage supply and sweep circuitry to be designed for efficient operation and also permits the energy stored in the deflection system to be regained during each deflection cycle to supply the high voltage needed for the cathode ray tube. In radar P.P.I. displays using a stationary deflecting yoke with two fields at right angles, and separate amplifiers for the coils producing the two fields, the recurrence of the sweep waveforms is modulated at a slow rate and therefore the energy stored in the deflection system cannot be readily utilized for any other purpose. However, such systems are more readily adaptable to superposed deflections for inserting extra information on the P.P.I. display.

An article by the present inventor in "Electronics" May 1956, describes such a P.P.I. system in which the time ordinarily allowed, after the outward radial sweep (with any intensity modulation resulting from returned echoes), for the return inward sweep (normally blanked) is also utilized for presenting extra information. In this article the extra information is derived from a plurality of automatic tracking computers and involves coordinate values corresponding to predicted positions of various objects. Various other cathode ray tube systems also might involve the insertion of extra information requiring deflection components of somewhat irregular form. The normal deflection coil currents would be of sawtooth waveform, while the extra information would require brief steps during part of the interval normally used for the steep return portion of the sawtooth and therefore even steeper portions during other parts of such interval, causing a high value of the first derivative $di/dt$ of the coil current. The computed coordinates would ordinarily bear no relation to the normal sweep coordinates; therefore, one sweep coordinate might be increased and another decreased or even reversed to insert the extra information, often involving greater total change in the deflection coil currents and with less time available to accomplish such change. Such steep current changes thru deflection coils of high inductance require rather high driver voltages during the brief time such changes are being accomplished. The result and purpose of such steep current changes is commonly referred to as "slewing" although only a visible spot and no appreciable mass is involved except in the sense that inductance is considered as mass from the mechanical analogy viewpoint.

To distinguish the computed information from the normal radar echoes it is often desirable to generate some simple additional scan such as a small circle, ellipse, etc. and to provide suitable spot brilliance during part or all of this additional scan or even somewhat longer, thus producing a dashed or partial circle, full circle, circle with tail, etc., commonly referred to as "tags." The current change required for this scan is of small amplitude but rather high frequency, and may require rather high voltage to overcome the deflection coil inductance.

To utilize both the normal sweep and computed coordinates for accomplishing the desired sweep, one suitable technique is to combine these as voltages and then use a differential feedback circuit to force the actual deflection coil current to follow this voltage waveform. Since the deflection coil currents are normally in the anode circuit of the driver amplifier, and the pulser of this invention is used to modify the available anode voltage, a direct feedback from the current in the deflection coil would be rather cumbersome. However, for convenience in the connection to the feedback circuit the deflection coil current may be readily measured in the cathode circuits of the amplifiers; in case of screen grid tubes a correction for the screen current, which flows in the cathode, but not the anode coil, may be obtained from the screen grid circuit. Use of a continuous high voltage on the driver amplifier anode circuit for the deflection coils would be operable with such a differential feedback circuit, but would require a power supply of high rating and would involve excessive losses in the amplifier.

An object of this invention is to provide a simple circuit to supply the increased voltage needed during slewing without increasing the losses involved in normal operation of the deflection amplifier.

Other objects of the invention will be apparent from the following description and accompanying drawings, in which:

Fig. 1 shows a cathode ray tube with a deflecting system including a suitable circuit for applying the normal operating voltage and also the high voltage needed during slewing.

Fig. 2 includes a series of typical waveforms involved in the operation of Fig. 1.

Fig. 3 illustrates the geometric relations involved in the deflection system particularly in relation to the lower portion of Fig. 1.

Fig. 1 includes the basic display system 11, including the cathode ray tube and deflection amplifiers connected in the customary manner, and anode pulser 13 therefor, forming the subject matter directly involved in the present invention. Fig. 1 also includes beam intensity circuits 15 and 17 respectively, to assure display of the extra information and the usual PPI data with proper relative intensity, and to eliminate loss of contrast in the display from energization directed beyond the limits of the tube face and causing a diffused glow thereover; these circuits are the subject matter of applications by the present inventor for Area Balanced Pulse Amplifier and Off Screen Blanking Circuit, Serial Nos. 642,629 and 642,630, now Patent Nos. 2,858,471 and 2,864,969, respectively, filed concurrently herewith.

As shown in Fig. 1 the deflection coil 21 NS on cathode ray tube 23 is controlled by the push-pull driver 25 NS. The cathode and screen-grid currents in this driver are supplied to a differential feedback system 27 NS which has as one function to subtract the screen-grid currents from the cathode currents and thereby determine the actual plate current which passes thru the deflection coil. The voltage input 29 NS, intended to establish the actual waveform of the deflection current, is also supplied to the differential feedback system which has a second function to regulate the control grids of the drivers 25 NS by the input waveform and the actual current in the deflection coil, as determined by the subtraction, so that the current waveform in the deflection coil actually corresponds to the voltage waveform supplied at the input 29 NS to the differential feedback system. A similar deflection coil 21 EW and corresponding circuits provides for the deflection at right angles to that provided by coil 21 NS. The deflection voltage input to differential feedback systems 27 NS, and 27 EW, includes components corresponding to the normal PPI sweep and any offset voltage therefor, and also the computed coordinates, tag generating voltage, etc. from each computer in use.

In the pulser 13 the normal power supply to the deflection coils 21 NS and 21 EW is connected thru diode 31, the anode of which is connected to a source of low voltage, shown as 150 volts, which is adequate during most of the period of operation of the drivers. An additional power supply is connected thru a triode 33 to a source of high voltage, shown as 1000 volts. To permit the high voltage to be applied during the proper intervals the grid of this triode is connected to the anode of an additional control triode 35 and thru a resistor 37 to the cathode of a control diode 39, the anode of which is connected to a source of power somewhat higher than that connected to the anode of diode 18 and shown as 300 volts. The cathode of this diode 39 is also coupled by a capacitor 41 to cathodes of the triode 33 and the diode 31. The cathode of the triode 35 is grounded. Normally, this triode 35 and diode 39 are both conductive causing a substantial voltage drop across resistor 37 and a substantial potential stored on capacitor 41, but during any time when the derivative of the input voltage to the differenial feedback amplifiers is of high value a negative pulse is applied to the grid of triode 35. This serves to cut off this triode and thereby raise its plate potential to a value between 150 and 300 volts. As soon as triode 35 cuts off and the grid of triode 33 rises, the latter triode starts to conduct, rapidly raising its cathode potential, and the capacitor 41 maintains the grid of triode 33 at a positive potential relative to its cathode. The diode 39 stops conducting as soon as triode 33 starts to conduct and raises the cathode of diode 39 more positive than its anode. This connection from cathode to grid thru a condenser is commonly known as a "bootstrap" since the triode anode voltage rise also causes a rise in its grid voltage. Therefore, the cathode of triode 33 can rise to a potential well above 700 volts as long as the control input pulse to the grid of triode 35 is maintained, without using a continuous high voltage supply for the control circuit.

Since the differential feedback systems 27 NS and EW control operation of the driver amplifiers 25 NS and EW the added anode voltage merely makes it possible for the driver amplifiers to overcome the deflection coil inductance and follow the steep waveforms involved in the input voltage to the differential feedback systems. Since the time of occurrence of high values in the derivative of the input voltage and of the desired current is usually limited to the period of the normal return trace of a radar P.P.I. sweep, the simplest pulse input to the grid of triode 35 is derived from this return trace. However, it is also possible to actually differentiate the input voltage to the feedback systems and utilize the actual differentiated voltage to control the grid of triode 35.

The tag intensity control circuit 15 and off screen blanking circuit 17 are more fully described in the other applications identified above, but will also be briefly described herein.

To provide suitable intensity for various tags a plurality of cathode follower mixers 51a and b are connected in the circuit of the cathode ray tube control grid 53, and one grid of each is connected to a control circuit 55a and b, one of which is shown diagrammatically. When a particular "tag" is to be applied the corresponding input 57a or b is energized by a negative signal which is applied to the grid of normally energized triode 59 to cut it off. The normally deenergized triode 61, biased to a voltage determined by the setting of potentiometer 63, starts to conduct as soon as capacitor 65 raises the grid above the cutoff potential of the triode; this prevents further anode voltage rise. A similar capacitor 67 coupled to the grid of one cathode follower tube 51a applies the proper voltage to the cathode ray tube grid. The similarity of the two capacitor coupled circuits provides for an area-balancing of the pulse waveform and maintains uniform cathode ray tube grid voltage during the proper interval for each tag even if duty cycles vary widely.

The diode 69 having its anode grounded and its cathode connected to the cathode ray tube cathode 71 maintains the latter just below ground potential except when the cathode ray tube beam current increases beyond the point where the voltage drop in resistor 73 exceeds the voltage applied, shown as —300 volts. At this point the sudden voltage rise on the cathode limits the beam current rather sharply to prevent excessive brilliance and burning of the cathode ray tube screen.

To provide off screen blanking, voltages corresponding to the NS and EW deflection coordinates are each combined first in diodes 81a–d to make their values dependent only on absolute coordinate magnitude, independent of the quadrant, then in resistor networks 83e–h so that coordinate values may be combined in several proportions. The largest of these combined values is then selected by diodes 85e–h and applied to control amplifier 87; if greater than a preset value determined by potentiometer 89 the cathode ray tube grid is biased to suppress the beam. The effect of combining the values in several proportions is illustrated by the several diagonal lines in Fig. 3 and the diodes 85e–h serve to select those lines forming approximately a 90° arc.

In Fig. 2 several typical waveforms are shown to illustrate the operation of the system of Fig. 1. The various waveforms are identified according to the corresponding locations on Fig. 1. It is noted that the three inputs shown for each of the differential feedback systems are combined before actual use, but the combined waveform is not shown; the normal P.P.I. sweep voltages are gated off to permit inserting the square pulses corresponding to the computer outputs, and the circle drawing sine-cosine wave segments are merely added during such square pulses. The anode pulser input wave controls this circuit as indicated above to provide the required high voltage for the driver amplifier during the time of slewing. The pulse echo input on lead 91, tag intensification, and off screen blanking are all related to the cathode ray tube control grid operation; as shown the echoes occur along the effective part of the normal sweep, the intensification occurs during the proper time for tag presentation, and the blanking occurs while the P.P.I. sweep is of too great amplitude and would extend beyond the cathode ray tube face. Due to space limitations in the wave form diagrams they do not necessarily follow the actual waveforms. For example: the circle drawing sine-cosine waves use 3 cycles instead of 1; the pulser voltage is ordinarily applied only during actual slewing, by differentiating the deflection waveform, instead of the entire return trace period; and the intensity control pulses would be narrower than pulses from the computers to raise the beam intensity only while the deflection is reasonably stable, during one of the 3 cycles of the circle drawing.

In most cases the elements are shown in their simplest form, and many variations would be possible. For example: the triode 33 is sometimes replaced by a pentode, the screen grid being connected thru a resistor to the cathode of diode 39 so that the same bootstrap circuit will control both screen and control grid. Therefore, any reference to triode is intended to include analogous tubes having further electrodes.

The values of the components are shown in some detail in the publication, but only a few are of any significance. The time constants of the circuits including the capacitors 65 and 67 are identical since each includes a 0.01 mfd. capacitor and a 1.0 megohm resistor. The bootstrap circuit includes a 0.01 mfd. capacitor and 30,000 ohm resistor.

A preferred embodiment of the invention has been described to facilitate an understanding of the invention, but many variations will be apparent to those skilled in the art.

What is claimed is:

1. A cathode ray tube deflection system including a deflection coil, a driver amplifier therefor to provide a desired deflection including intervals of rapid deflection, a source of high anode potential, means operable during said intervals of rapid deflection to supply said high anode potential to said coil and driver, and a source of low anode potential normally connected to said coil and driver.

2. A cathode ray tube deflection system including a deflection coil, a driver amplifier therefor to provide a desired deflection including intervals of rapid deflection, a source of high anode potential, means operable during said intervals of rapid deflection to supply said high anode potential to said coil and driver, and a source of low anode potential connected through a rectifier to said coil and driver to supply said low anode potential to said coil and driver other than during said intervals and to disconnect said low anode potential during said intervals.

3. A cathode ray tube deflection system including a deflection coil, a driver amplifier therefor, a source of voltage of a waveform corresponding to a desired deflection including intervals of rapid deflection, a differential feedback circuit responsive to the deflection coil current and the voltage source to control the driver amplifier for obtaining the desired deflection, a source of low anode potential normally connected to said coil and driver through a diode, a source of high anode potential connected to said coil and driver through a first triode when said troide is operated, a control circuit for said triode comprising a normally conductive control triode having its cathode at low potential and its anode connected to the grid of said first triode to hold it nonconductive, means to supply a negative pulse to the grid of said control triode during said intervals of rapid deflection to render said first triode conductive for supplying a high anode voltage to said coil and driver, and means to supply a high voltage through a resistor to the anode of said control triode.

4. A cathode ray tube deflection system including a deflection coil, a driver amplifier therefor, a source of voltage of a waveform corresponding to a desired deflection including intervals of rapid deflection, a differential feedback circuit responsive to the deflection coil current and the voltage source to control the driver amplifier for obtaining the desired deflection, a source of low anode potential normally connected to said coil and driver through a diode, a source of high anode potential connected to said coil and driver through a first triode when said triode is operated, a control circuit for said triode comprising a normally conductive control triode having its cathode at low potential and its anode connected to the grid of said first triode to hold it nonconductive, means to supply a negative pulse to the grid of said control triode during said intervals of rapid deflection to render said first triode conductive for supplying a high anode voltage to said coil and driver, and means to supply a high voltage through a resistor to the anode of said control triode, including a source of voltage higher than said low anode potential connected through a control diode to said resistor for initiating operation of said first triode, and a capaictor connected from the cathode of said first triode to the cathode of said control diode for maintaining operation of said first triode throughout said negative pulse.

5. A pulsed voltage supply comprising a source of low anode potential normally connected to a load through a diode, a source of high anode potential connected to said load through a first triode when said triode is operated, a control circuit for said triode comprising a normally conductive control tirode having its cathode at low potential and its anode connected to the grid of said first triode to hold it nonconductive, means to supply a negative pulse to the grid of said control triode during selected intervals to render said first triode conductive for supplying a high anode voltage to said load, and means to supply a high voltage through a resistor to the anode of said control triode.

6. A pulse voltage supply comprising a source of low anode potential normally connected to a load through a diode, a source of high anode potential connected to said load through a first triode when said triode is operated, a control circuit for said triode comprising a normally conductive control triode having its cathode at low potential and its anode connected to the grid of said first triode to hold it nonconductive, means to supply a negative pulse to the grid of said control triode during selected intervals to render said first triode conductive for supplying a high anode voltage to said load, and means to supply a high voltage through a resistor to the anode of said control triode, including a source of voltage higher than said low anode potential connected through a control diode to said resistor for initiating operation of said first triode, and a capacitor connected from the cathode of said first triode to the cathode of said control diode for maintaining operation of said first triode throughout said negative pulse.

References Cited in the file of this patent

UNITED STATES PATENTS

| | | |
|---|---|---|
| 2,248,581 | Norgaard | July 8, 1941 |
| 2,453,711 | Isbister | Nov. 16, 1948 |
| 2,455,283 | Valley | Nov. 30, 1948 |
| 2,546,065 | Girling | Mar. 20, 1951 |
| 2,566,432 | Sziklai | Sept. 4, 1951 |
| 2,579,627 | Tourshau | Dec. 25, 1951 |
| 2,653,274 | Babcock | Sept. 22, 1953 |
| 2,729,766 | Vilkomersan | Jan. 3, 1956 |
| 2,752,527 | Ropiequet | June 26, 1956 |